United States Patent [19]
King et al.

[11] Patent Number: 5,866,178
[45] Date of Patent: *Feb. 2, 1999

[54] APPARATUS FOR LOADING A TREAD MOLD ON A BUILT TIRE

[75] Inventors: Michael J. King; Robert A. Flynn, both of Athens, Ga.; Andrew R. Clayton, Salisbury, N.C.

[73] Assignee: Oliver Rubber Company, Athens, Ga.

[*] Notice: The term of this patent shall not extend beyond the expiration date of Pat. No. 5,354,406.

[21] Appl. No.: 707,597

[22] Filed: Sep. 5, 1996

Related U.S. Application Data

[60] Division of Ser. No. 475,570, Jun. 7, 1995, Pat. No. 5,653,847, which is a continuation-in-part of Ser. No. 311,581, Sep. 22, 1994, Pat. No. 5,554,241, which is a division of Ser. No. 45,914, Apr. 12, 1993, Pat. No. 5,354,406, which is a continuation-in-part of Ser. No. 908,228, Jul. 2, 1992, abandoned.

[51] Int. Cl.⁶ .................................................. B29C 35/00
[52] U.S. Cl. ...................................... 425/450.1; 425/451.9
[58] Field of Search ..................... 294/88, 902; 414/21, 414/763; 425/450.1, 451.3, 451.9; 249/56, 57, 139, 205

[56] References Cited

U.S. PATENT DOCUMENTS

| | | | |
|---|---|---|---|
| 1,179,898 | 4/1916 | Coffey, Jr. et al. . | |
| 1,600,586 | 9/1926 | Hatfield . | |
| 2,030,861 | 2/1936 | Fisher | 18/18 |
| 2,094,511 | 9/1937 | Welch | 18/6 |
| 2,128,417 | 8/1938 | Kerr | 18/17 |
| 2,155,906 | 4/1939 | Rihn et al. | 18/18 |
| 2,390,293 | 12/1945 | Colson | 294/86 |
| 2,567,985 | 9/1951 | Baker et al. | 18/18 |
| 2,840,857 | 7/1958 | Lett | 18/44 |
| 2,985,917 | 5/1961 | Sunday | 18/43 |
| 3,170,195 | 2/1965 | Knox | 18/45 |
| 3,429,005 | 2/1969 | MacMillan | 18/18 |

(List continued on next page.)

FOREIGN PATENT DOCUMENTS

| | | | |
|---|---|---|---|
| 0405350 | 1/1991 | European Pat. Off. | B29D 30/56 |
| 0431872 | 6/1991 | European Pat. Off. | B29D 30/54 |
| 1134825 | 2/1961 | Germany | B29H 5/18 |

OTHER PUBLICATIONS

Declaration of Michael J. King Under 37 C.F.R. § 1.132 dated Jun. 20, 1997.
Declaration of James D. Foughty Under 37 C.F.R. § 1.132 dated Jun. 25, 1997.
Declaration of Robert A. Flynn Under 37 C.F.R. § 1.132 dated Jun. 23, 1997.
Oliver, "Specifications/Quik–Seal IV", undated, 1 pg.
The Oliver Group, "Pneuflex/New tire appearance. Retreated cost.", undated, 3 pgs.
European Search Report to Uexkull & Stolberg, dated Jun. 1995, re: 93916764, 6 pages.
Notation Doc F–1, Trademark Registration for Pneuflex, Reg. No. 1,829,844, registered Apr. 5, 1994, 1 page.
Notation Doc F–2, Trademark Registration for Pneuflex, Reg. No. 1,852,868, Registered Sep. 6, 1994, 1 page.
Declaration of Michael J. King Under 37 C.F.R. § 1.132 dated Oct. 18, 1996.

(List continued on next page.)

*Primary Examiner*—Richard Crispino
*Attorney, Agent, or Firm*—Baker & Botts, L.L.P.

[57] ABSTRACT

Tire recapping or retreading apparatus and method including the use of a tread mold with a plurality of mold segments. A tread mold loading machine is used to position a prepared tire carcass or built tire relative to the mold segments and to install the mold segments on the exterior of the built tire. The mold segments are retained in place on the exterior of the tire carcass by a pair of tension springs. The tension springs hold the mold segments on the tire carcass after the mold segments have been released from the tread mold loading machine. The use of the tread mold loading machine and the mold segments eliminates distortion of the tire carcass during installation of the tread mold on the exterior of the built tire.

7 Claims, 8 Drawing Sheets

5,866,178
Page 2

U.S. PATENT DOCUMENTS

| | | | |
|---|---|---|---|
| 3,460,197 | 8/1969 | Cantarutti et al. | 18/2 |
| 3,479,693 | 11/1969 | Cantarutti | 18/17 |
| 3,770,032 | 11/1973 | Stull | 144/288 A |
| 3,850,555 | 11/1974 | Pasch | 425/46 |
| 3,852,006 | 12/1974 | Irie | 425/47 |
| 3,976,532 | 8/1976 | Barefoot | 156/405 |
| 3,983,193 | 9/1976 | Wulker et al. | 264/36 |
| 3,983,926 | 10/1976 | Müller | 294/88 |
| 3,990,821 | 11/1976 | MacMillan | 425/19 |
| 3,994,653 | 11/1976 | Marangoni | 425/374 |
| 3,999,907 | 12/1976 | Pappas | 425/20 |
| 4,036,677 | 7/1977 | Marangoni | 156/394 |
| 4,086,047 | 4/1978 | Johnsen | 425/450.1 |
| 4,088,521 | 5/1978 | Neal | 156/96 |
| 4,129,406 | 12/1978 | Capecchi | 425/46 |
| 4,185,056 | 1/1980 | Detwiler | 264/36 |
| 4,252,358 | 2/1981 | Klebs | 294/67 BB |
| 4,256,429 | 3/1981 | Dwyer | 294/88 |
| 4,309,234 | 1/1982 | Witherspoon | 156/96 |
| 4,328,053 | 5/1982 | Medlin, Jr. | 156/96 |
| 4,401,502 | 8/1983 | Schmidt | 156/397 |
| 4,486,136 | 12/1984 | Howard | 414/21 |
| 4,588,460 | 5/1986 | Magee et al. | 156/96 |
| 4,767,748 | 8/1988 | Goldstein | 156/96 |
| 4,781,233 | 11/1988 | Williams | 157/16 |
| 4,792,379 | 12/1988 | Magee et al. | 156/909 |
| 4,808,898 | 2/1989 | Pearson | 318/568 |
| 4,812,281 | 3/1989 | Beard et al. | 264/502 |
| 4,874,194 | 10/1989 | Borecea et al. | 294/88 |
| 4,946,554 | 8/1990 | Magee et al. | 156/909 |
| 4,957,574 | 9/1990 | Clayton et al. | 156/126 |
| 4,963,221 | 10/1990 | Isobe et al. | 156/358 |
| 5,306,130 | 4/1994 | King et al. | 425/17 |
| 5,342,462 | 8/1994 | King et al. | 156/96 |
| 5,354,406 | 10/1994 | King et al. | 156/421.6 |
| 5,494,551 | 2/1996 | Stevens | 156/394.1 |

OTHER PUBLICATIONS

Declaration of Andrew R. Clayton Under 37 C.F.R. § 1.132 dated Oct. 15, 1996.

Declaration of Robert A. Flynn Under 37 C.F.R. § 1.132 dated Oct. 11, 1996.

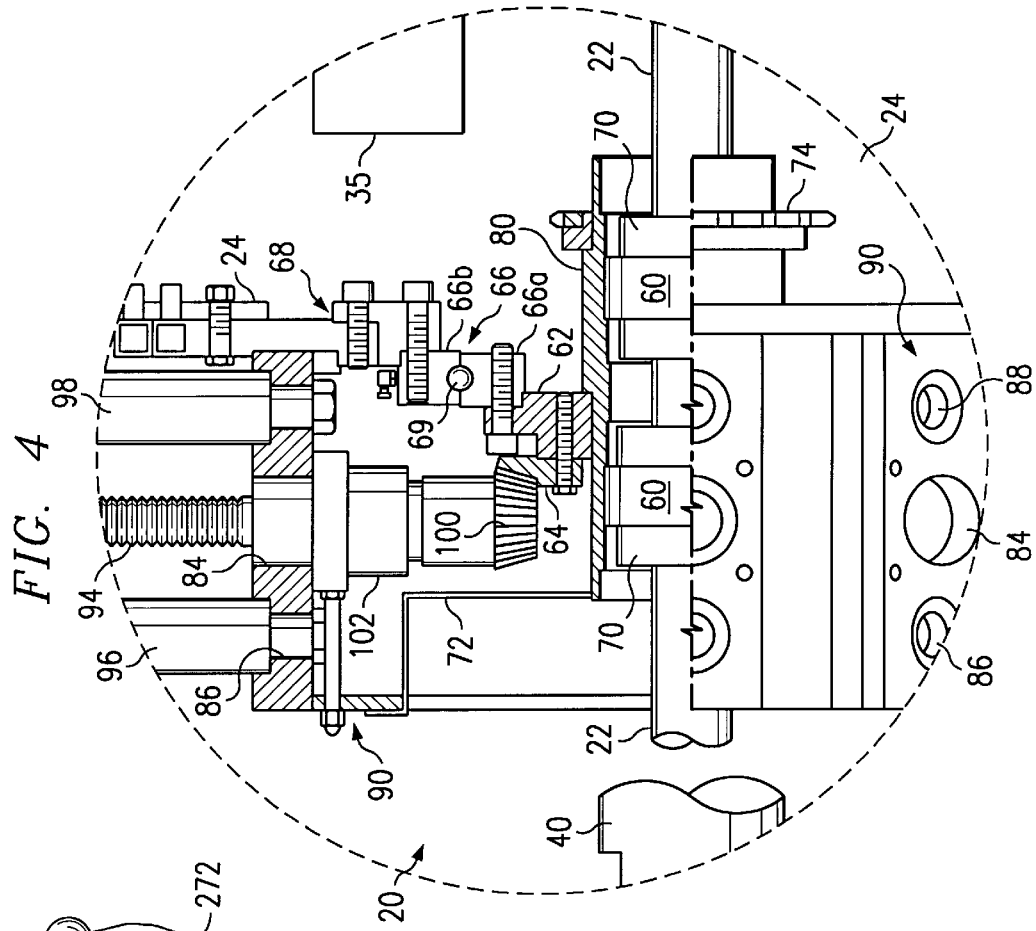
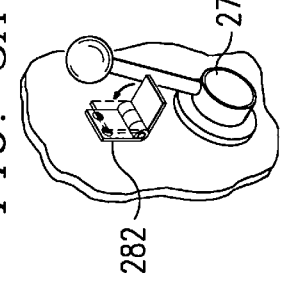
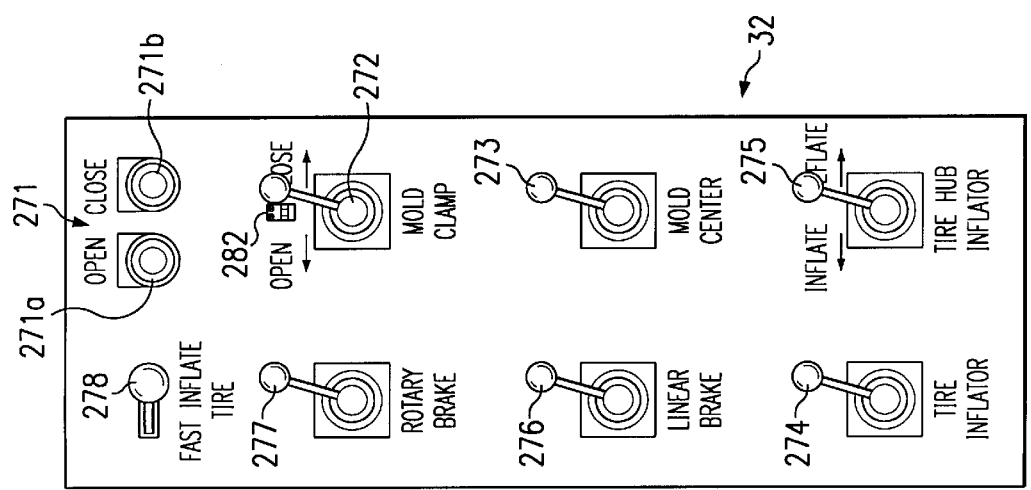

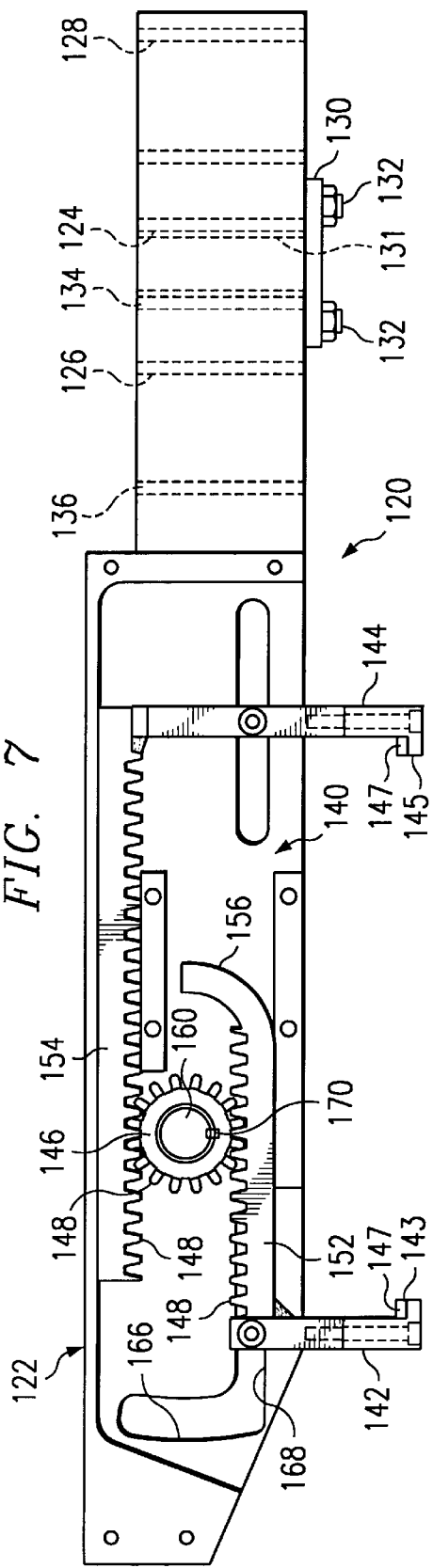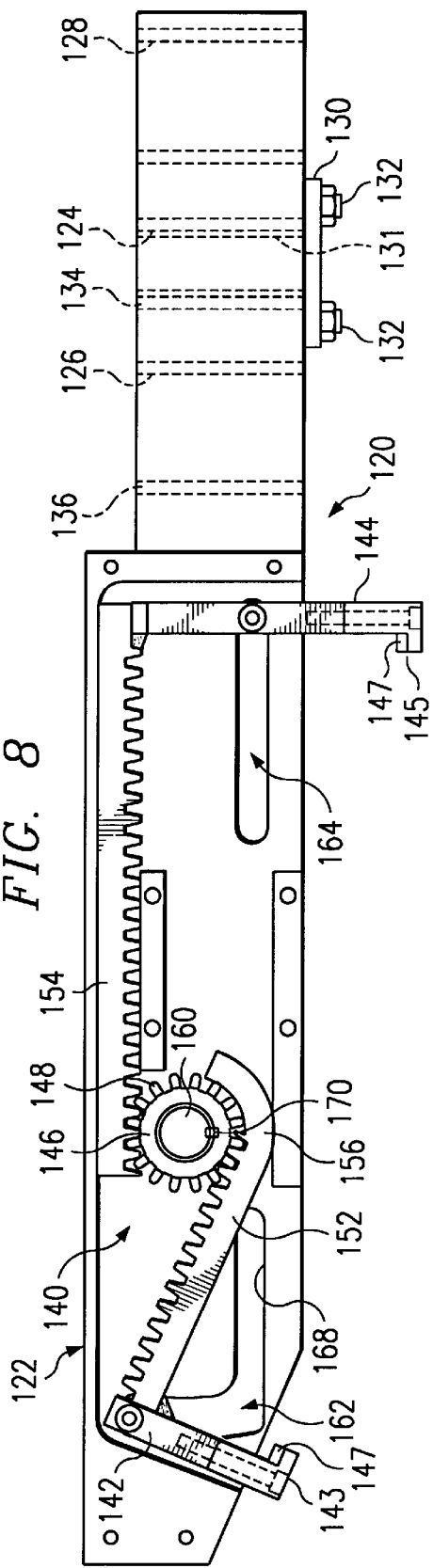

APPARATUS FOR LOADING A TREAD MOLD ON A BUILT TIRE

This application is a divisional of application Ser. No. 08/475,570 filed Jun. 7, 1995, now U.S. Pat. No. 5,653,847 dated Aug. 5, 1997, entitled Enhanced Tread Mold Expander, which is a continuation-in-part of application Ser. No. 08/311,581 filed Sep. 22, 1994, now U.S. Pat. No. 5,554,241 dated Sep. 10, 1996, entitled Apparatus and Method for Retreading a Tire, which is a divisional application of application Ser. No. 08/045,914 filed Apr. 12, 1993, now U.S. Pat. No. 5,354,406 dated Oct. 11, 1994, entitled Apparatus for Retreading a Tire, which is a continuation-in-part of U.S. patent application Ser. No. 07/908,228 filed Jul. 2, 1992, now abandoned.

TECHNICAL FIELD OF THE INVENTION

This invention relates generally to methods and apparatus for retreading a tire casing. More particularly, but not by way of limitation, this invention relates to a tread mold loading machine used to install a plurality of mold segments on retreading material on the exterior of the tire casing and to remove the mold segments after the retreading material has been cased with the desired tread pattern.

BACKGROUND OF THE INVENTION

A wide variety of procedures and different types of equipment are available for use in recapping or retreading tires. One of the first steps in retreading a worn tire is to remove existing tread material from the tire carcass by buffing. Various procedures are available to apply one or more layers of uncured rubber or retreading material with appropriate bonding agents to the buffed tire carcass. The uncured rubber may also be stitched to the buffed carcass as required. For purposes of this patent application, the term "built tire" is used to refer to a buffed tire carcass or casing which has been built up with one or more layers of uncured rubber and other material as required by the retreading equipment and procedures being used to retread the worn tire.

In the past, heavy duty mechanical and/or hydraulic closing devices have often been used to install molds which form a new tread in retreading material on a prepared tire carcass or built tire. Tire distortion sometimes occurs as the tread molds are closed on the built tire. This problem is particularly common if the built tire is slightly larger in diameter than desired. In such cases, the prepared tire carcass will often buckle and can thus no longer be used. Damage to a built tire during mold installation represents a substantial loss of time and material spent preparing the built tire for mold installation.

One method of recapping or retreading tires is illustrated in U.S. Pat. No. 4,767,480 entitled Cold Recapping Method for Tires Utilizing Uncured Rubber and Sectioned Mold, issued Aug. 30, 1988 to Leon C. Goldstein. This patent describes apparatus and methods for retreading which uses a cold process. In this process, a flexible tread mold is stretched over the prepared tire carcass. Subsequently, an envelope is placed over the mold and built tire and the entire unit or assembly is placed in a chamber for curing of the rubber. U.S. Pat. No. 4,588,460 entitled Method and Apparatus for Recapping a Tire with a Flexible Segmented Mold, issued May 13, 1986 to Arthur W. McGee, et al. illustrates another method and apparatus for retreading a tire that includes a relatively flexible mold which is formed by a plurality of mold segments. U.S. Pat. Nos. 5,306,130, entitled Apparatus for Recapping a Tire and an Improved Curing Envelope for Use Therein, and 5,342,462, entitled Apparatus and Method for Retreading a Tire, show other types of tire retreading equipment and methods.

Pneumatic tires may also be recapped or retreaded by installing a continuous replacement tread on a prepared tire carcass. Both uncured and cured rubber compounds have previously been used to provide continuous replacement treads. Examples of equipment and procedures to install continuous replacement treads on a tire casing are shown in U.S. Pat. Nos. 3,976,532 entitled Tread Applying Machine, dated Aug. 24, 1976 and issued to C. K. Barefoot; 4,088,521 entitled Method of Retreading a Tire with an Endless Premolded Tread, dated May 9, 1978 and issued to P. H. Neal; 4,036,677 entitled Machine for Treating Worn Out Pneumatic Tires and for Applying a PreMolded Tread Ring, dated Jul. 19, 1977 and issued to Carlo Marangoni; and 4,957,574 entitled Tread Centering Method and Apparatus, dated Sep. 18, 1990 and issued to A. R. Clayton, et al.

Retreading procedures often require the use of a flexible envelope to seal around the tire casing, retread material and tread mold. The complete assembly, including the tire casing, retread material, tread mold and envelope, are placed in a high pressure, high temperature chamber in preparation for curing the components which comprise the completed tire assembly. This chamber is frequently referred to as an autoclave. Examples of a tire retreading envelope and high pressure, high temperature curing chamber are shown in U.S. Pat. No. 4,309,234 entitled Tire Retreading Envelope Seal, dated Jan. 5, 1982 and issued to P. L. Witherspoon. U.S. Pat. No. 4,767,480 also contains information on such envelopes for curing retreaded tires.

The above listed patents are incorporated by reference for all purposes within this application.

SUMMARY OF THE INVENTION

In accordance with the present invention, the disadvantages and problems associated with previous methods and apparatus for retreading tires including installing tread mold segments on the exterior of a built tire have been substantially reduced or eliminated.

One object of this invention is to provide methods and apparatus for retreading pneumatic tires which eliminate the need for high pressure mold closing equipment. The present invention includes a tread mold loading machine which can install tread molds on a wide range of tire sizes with significant variations in critical tire dimensions without damage to the associated tire casing. The resulting retread tire assembly can be cured in existing hot air chambers using conventional chamber cure retreading techniques. A tread mold loading machine incorporating the teachings of the present invention substantially reduces or eliminates casing distortion and buckling of a casing while loading a tread mold on a built tire.

Another object of the present invention is to provide a method and apparatus for retreading tires that avoids deforming the tire carcass when tread mold segments are placed thereon and thus reduces tire loss during the retreading operation. The present invention includes the use of an expandable tread mold having a plurality of rigid mold segments which will accommodate variations in casing dimensions. Mold segments with a wide variety of different tread patterns may be used with the present invention. Examples of these patterns include the tread designs associated with drive tires, intermodal and trailer tires and most commercial radial tires.

The present invention provides, in one aspect, apparatus for retreading a prepared tire carcass or built tire having a layer of retreading material located around the exterior thereof. Various techniques may be used to prepare or build the tire carcass without requiring a splice in the retread material. The appropriate expandable tread mold is placed on a tread mold loading machine in accordance with the teachings of the present invention and expanded to receive the built tire. After centering the built tire within the expanded tread mold, the tread mold loading-machine closes the tread mold onto the layer of retreading material. The tread mold and built tire assembly are then removed from the tread mold loading machine and placed in an elastomeric curing envelope. Seal rings are preferably added to form a seal between the curing envelope and the rim of the tire. The curing envelope preferably includes a hollow valve stem which may be connected to a vacuum source or vented to the atmosphere. This package may then be placed in a curing chamber. The appropriate amount of heat and pressure are applied to the package which results in the individual mold segments closing with respect to each other and forming the desired tread pattern in the retreading material as the tire is cured.

One technical advantage of the present invention is to provide a tread mold loading machine which includes an expandable hub attached to a longitudinal shaft or main axle which may be used to position a prepared tire carcass for installation of tread mold segments. The main axle of the tread mold loading machine allows both longitudinal movement and rotational movement of the prepared tire carcass while mounted on the expandable hub. A brake system may also be provided to releasably hold the main axle and expandable hub in a desired longitudinal and/or radial position.

Another technical advantage of the present invention includes a plurality of mold segment supporting arms which may be moved inwardly and outwardly with respect to a built tire to allow installation of an expandable tread mold on the exterior of the tire casing. Each tread mold supporting arm includes a clamp which may be easily engaged and disengaged from the associated mold segment to allow removal of the built tire and the installed tread mold from the tread mold loading machine.

A further technical advantage of the present invention includes providing a sensor which will indicate when the tread mold segments have made contact with retreading material on the exterior of the casing. The sensor prevents the application of excessive force to the tire casing by the tread mold loading machine during installation of the tread mold on the casing. The sensor is one of the components which allows the tread mold loading machine to accommodate built tires with significant variations in critical dimensions without damaging oversized casings.

Additional technical advantages of the present invention include combining the best techniques associated with pre-cure tire retreading and mold cure tire retreading in a chamber cure retreading process to provide excellent tread-to-casing bonding, increased mileage, better tire balance and greater reliability at a lower cost per mile of tire use as compared to other retreading systems and methods. As a result of the teachings of the present invention a wide variety of methods may be used to place retreading material on the exterior casing without requiring a splice in the retreading material which enables the resulting retread tire to provide greater reliability and balance. The use of spliceless retreading material also gives a more attractive cosmetic appearance to the retread tire.

BRIEF DESCRIPTION OF THE DRAWINGS

For a more complete understanding of the present invention, and the advantages thereof, reference is now made to the following description taken in conjunction with the accompanying drawings in which:

FIG. 3 is an enlarged schematic drawing showing the front of the control panel for the tread mold loading machine of FIG. 1;

FIG. 3A is a schematic drawing showing a safety latch satisfactory for use with the present invention;

FIG. 4 is an enlarged fragmentary drawing in section and in elevation with portions broken away showing bearings and gears associated with the main axle of the tread mold loading machine of FIG. 1;

FIG. 7 is a drawing in section and in elevation with portions broken away illustrating a tread mold supporting arm used with the tread mold loading machine of FIG. 1, in its first position which releasably secures a mold segment thereto;

FIG. 8 is a drawing in section and in elevation with portions broken away illustrating the tread mold supporting arm of FIG. 7 in its second position which will release a mold segment therefrom;

DETAILED DESCRIPTION OF THE INVENTION

The preferred embodiments of the present invention and its advantages are best understood by referring to FIGS. 1 through 13 of the drawings, like numerals being used for like and corresponding parts of the various drawings.

Figure 1:
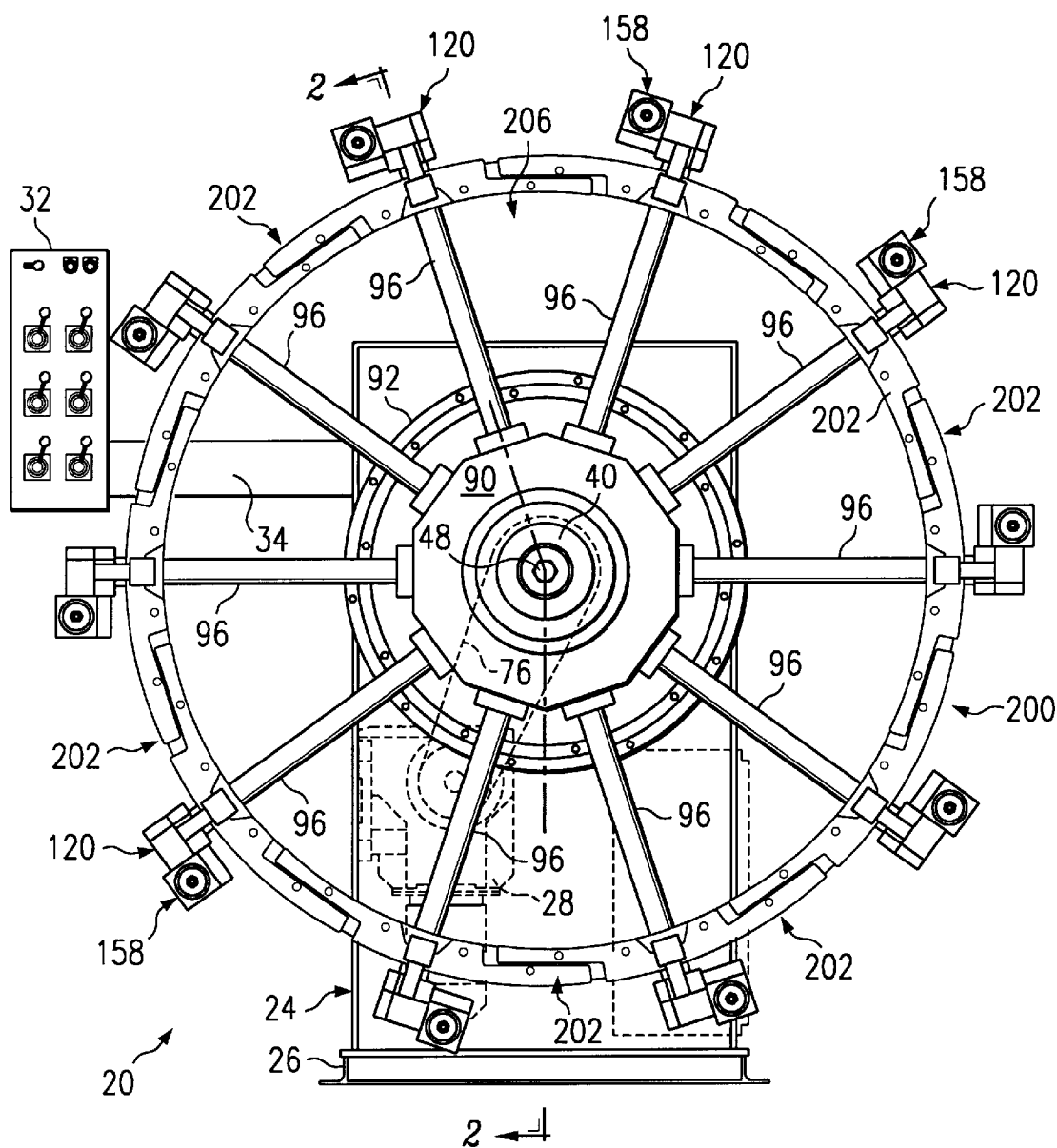
FIG. 1 is a schematic drawing in elevation with portions broken away showing a tread mold loading machine incorporating one embodiment of the present invention.
Figure 2:
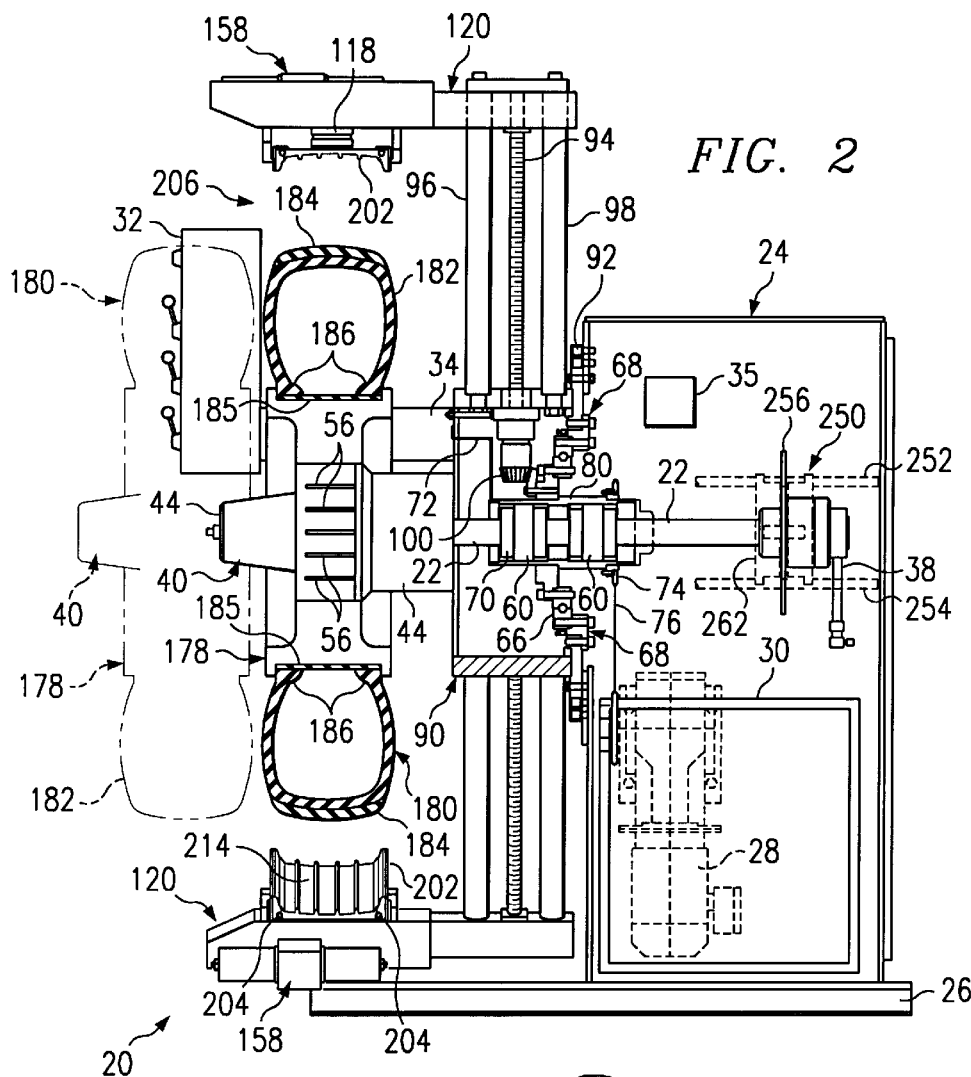
FIG. 2 is a schematic drawing in section and elevation with portions broken away, taken along line 2—2 of FIG. 1, showing a prepared tire carcass or built tire mounted on the tread mold loading machine of FIG. 1.

Tread mold loading machine 20, as best shown in FIGS. 1 and 2, is provided to install expandable tread mold 200 on the exterior of prepared tire carcass or built tire 180. Tread mold loading machine 20 may also be used to remove expandable tread mold 200 from built tire 180 after retreading material 184 has been properly cured. As illustrated in FIG. 1, expandable tread mold 200 is formed of a plurality of rigid mold segments 202. Ten mold segments 202 are illustrated, but any number of mold segments 202 can be used as required for the specific tread mold loading machine, built tire and tread pattern or design.

For purposes of this patent application, built tire 180 refers to pneumatic tire carcass or casing 182, which has been buffed to remove any old tread material (not shown), and a layer of adhesive or similar bonding agent (not shown) along with retreading material 184 applied to the exterior of carcass 182. Built tire 180 may be prepared for retreading using conventional procedures and equipment prior to mounting built tire 180 on tread mold loading machine 20. Tread mold loading machine 20 may also be referred to as a "tread mold expander."

Expandable tread mold 200 is sometimes referred to as an adjustable tread mold because it will accommodate built tires with significant variations in critical tire dimensions. The components which comprise expandable tread mold 200 will be described later in more detail. These components include a plurality of mold segments 202 and one or more annular tension springs 204. Mold segments 202 are preferably spaced radially from main axle 22 prior to mounting casing 180 on main axle 22. As shown in FIG. 1, mold segments 202 are positioned by tread mold loading machine 20 to define expanded opening 206 to receive built tire 180 therein.

As will be explained later in more detail, an important feature of tread mold loading machine 20 is the ability to move mold segments 202 radially with respect to main axle 22 and built tire 180 when mounted thereon. Equally important features of tread mold loading machine include the ability to move built tire 180 longitudinally relative to expandable tread mold 200 while mounted on main axle 22 and the ability to rotate built tire 180 while mounted on main axle 22. Brake system 250 is provided to prevent undesired rotational and/or longitudinal movement of main axle 22 while installing expandable tread mold 200 on retreading material 184.

The various components and subassemblies which comprise tread mold loading machine 20 are secured to, supported by or contained within housing 24, which in turn is attached to and rests upon base 26. Components contained within housing 24 include prime mover or electrical motor 28 and electrical power supply box 30. Control panel 32 is attached to the side of housing 24 and extends outwardly therefrom. Control panel 32 is secured to one end of cable channel and supporting frame 34. The other end of cable channel and supporting frame 34 is secured to housing 24 at opening 35. Electrical cables and other conduits (not shown) may be disposed within cable channel and supporting frame 34 to extend from control panel 32 through opening 35 to the appropriate component contained within housing 24 or secured to housing 24. Cable channel and supporting frame 34 extends from housing 24 to preferably position control panel 32 exterior from and adjacent to expandable tread mold 200 when built tire 180 is mounted on main axle 22.

The embodiment of tread mold loading machine 20 shown in FIGS. 1 and 2 is operated by a combination of electrical and pneumatic power. The various components and functions of tread mold loading machine 20 are controlled by a combination of electrical and/or pneumatic signals as appropriate. If desired, the electrical power functions and electrical control functions could be replaced by pneumatic and/or hydraulic power and control systems. In the same manner many of the components which are operated and controlled by pneumatic systems could be replaced by a hydraulic or electrical system with the exception of inflating built tire 180. Since built tire 180 is preferably inflated with air pressure while installing or loading expandable tread mold 200 thereon, there are several practical benefits from using the available air supply for other functions and purposes within tread mold loading machine 20. However, for specific applications and designs, these pneumatically operated components could be replaced by hydraulic and/or electrically operated components as desired.

Several of the components and subassemblies which comprise tread mold loading machine 20 are secured to or supported by main axle 22. These components include expandable hub 40, a pair of rotary bearings 60, a pair of linear bearings 70, hollow drive shaft 80 and brake system 250. Rotary bearings 60 and linear bearings 70 are preferably disposed between the exterior of main axle 22 and the interior of hollow drive shaft 80. Head assembly 90 is secured to the front portion of housing 24 by annular plate 92 which is bolted to the front of housing 24. Annular plate 92 and the attached head assembly 90 are concentrically disposed around the exterior of main axle 22. Main axle 22 is supported within housing 24 by annular plate 92 and associated components.

As shown in FIGS. 1 and 2, ten sets of radial arms 94 and there associated guide rails 96 and 98 extend outwardly from head assembly 90. Head assembly 90 includes appropriate openings 86 and 88 which extending radially therethrough to secure one end of each set of guide rails respectively 96 and 98 thereto. Additional openings 84 are provided through head assembly 90 to allow the installation of each radial arm 94 between its associated guide rails 96 and 98. As will be explained later in more detail, radial arms 94 are disposed within head assembly 90 in a manner which allows rotation of radial arms 94 in unison with each other.

A plurality of tread mold supporting arms 120 are secured to their associated radial arm 94 and guide rails 96 and 98. Each radial arm 94 is used to position its associated tread mold supporting arm 120 with respect to built tire 180 after built tire 180 has been mounted on main axle 22. Since radial arms 94 are rotated in unison with respect to each other, tread mold supporting arms 120 also move in unison with respect to each other.

Expandable hub 40 is secured to the end of main axle 22 which extends through head assembly 90 and the front of housing 24. Expandable hub 40 provides a portion of the means for releasably mounting built tire 180 onto main axle 22. The various components and elements which comprise expandable hub 40 are disposed on the exterior of hollow pipe 42. These components include tire rim 178. Preferably, tire rim 178 will be formed from multiple segments with elastomeric band 185 surrounding the segments. By using a segmented tire rim 178 and enclosing the exterior of tire rim 178 with elastomeric band 185, different sizes of tire casings may be satisfactorily mounted on main axle 22 using the same expandable hub 40 and segmented tire rim 178. For purposes of illustration, segmented tire rim 178 is shown in FIG. 2 but not shown in FIG. 1.

Figure 6:
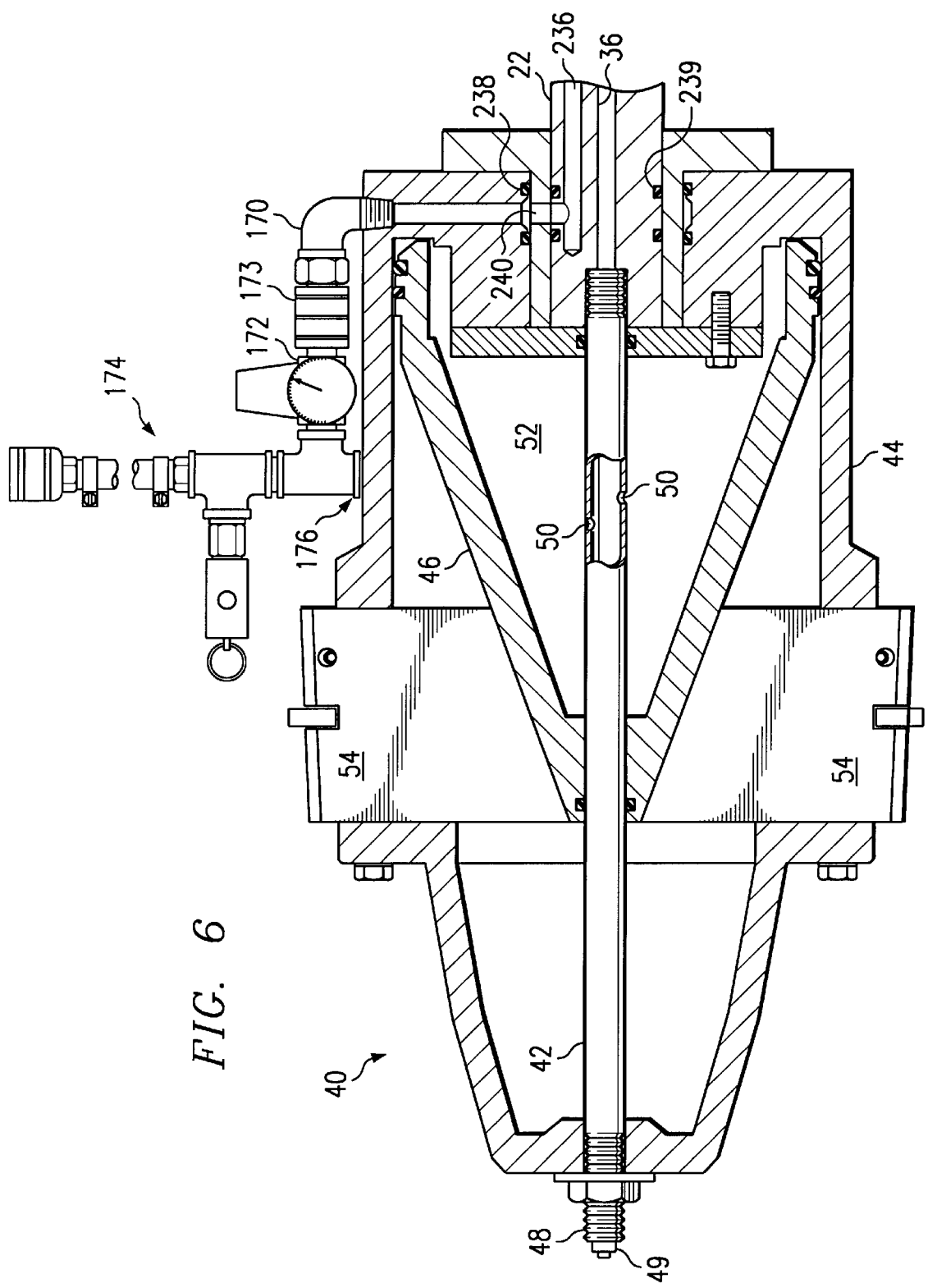
FIG. 6 is a schematic drawing in section and in elevation with portions broken away showing an expandable hub which may be attached to the main axle of the tread mold loading machine of FIG. 1.

As shown in FIG. 6, main axle 22 preferably has first longitudinal bore 36 extending therethrough and communicating with hollow pipe 42. Second longitudinal bore 236 is also formed in main axle 22 extending substantially parallel with first longitudinal bore 36 and radially offset therefrom. Air coupling 38 is provided on the end of main axle 22 contained within housing 24 and opposite from expandable hub 40. Air coupling 38 may be used to supply high pressure air to both first longitudinal bore 36 and second longitudinal bore 236. For some applications, it may be preferable to provide separate air supplies (not shown) with different operating pressures to first longitudinal bore 36 and second longitudinal bore 236.

Expandable hub 40 includes housing 44 with tapered cone 46 slidably disposed therein. Housing 44 and tapered cone 46 are concentrically disposed on the exterior of hollow pipe 42. End 48 of pipe 42, which extends from housing 44, is preferably closed with pipe plug 49. One or more holes 50 are provided in pipe 42 to allow air from first longitudinal bore 36 to enter chamber 52 defined in part by tapered cone 46.

Built tire 180 is mounted on tire rim 178 of expandable hub 40 prior to pressurizing chamber 52. By directing pneumatic (air) pressure through coupling 38, air will flow through longitudinal bore 36 and hollow pipe 42 into chamber 52 via holes 50. As the air pressure within chamber 52 increases, cone 46 will move towards the end of housing 44 and expand nylon inserts 54 through radial slots 56. As inserts 54 expand radially from housing 44, they will force the segments which comprise tire rim 178 and the associated elastomeric band 185 outwardly to form a fluid tight seal with tire beads 186 provided on the inside diameter of built tire 180.

A plurality of elastomeric seals 238 and 239 along with bore 240 are provided to direct high pressure air from second longitudinal bore 236 to air connection 170. The air pressure flowing through second longitudinal bore 236 is typically 120 to 150 psig. Regulator 172 may be provided in air connection 170 to reduce this air pressure to approximately thirty psig at hose connections 174 and 176. Sliding valve 173 is provided to control the flow of air pressure to regulator 172. Tire rim 178 may have two valve stems (not shown) to allow inflating built tire 180 when mounted on expandable hub 40. Two hose connections 174 and 176 and two valve stems may be provided to reduce the time required to inflate built tire 180. By providing second longitudinal bore 236 sufficient high pressure air may be provided to air connection 170 such that only a single hose connection 174 is required for rapid inflation of built tire 180. As will be discussed later in more detail, control panel 32 includes tire inflator switch 274 which controls normal inflation of built tire 180 and switch 278 which allows faster inflation of built tire 180. An important benefit of the present invention includes the ability of tread mold loading machine to accommodate a wide variety of tire sizes and types while at the same time substantially reducing the amount of time required to install and/or remove expandable tread mold 200 from the exterior of built tire 180.

Another important feature of the present invention, as best shown in FIGS. 2 and 4, is the cooperation between rotary bearings 60, linear bearings 70 and main axle 22 which allows longitudinal movement of expandable hub 40 relative to housing 24 and the other components which comprise tread mold loading machine 20. Rotary bearings 60 and linear bearings 70 allow expandable hub 40 to be moved longitudinally away from head assembly 90 and its associated tread mold supporting arms 120. The first position for expandable hub 40 and main axle 22, shown in FIG. 2 by dotted lines, facilitates mounting built tire 180 onto tire rim 178 and expandable hub 40. Tire rim 178 preferably remains on expandable hub 40 and may be used on a repeating basis with a large number of built tires to load expandable tread mold 200 on each respective built tire 180.

A pair of rotary bearings 60 and a pair of linear bearings 70 are disposed between the exterior of main axle 22 and the interior of hollow drive shaft 80. Linear bearings satisfactory for use with the present invention may be obtained from Boston Gear, a Division of Rockwell International. Rotary bearings satisfactory for use with the present invention may be obtained from INA/Torrington.

Air pressure can be supplied to chamber 52 to expand inserts 54 radiating outwardly to releasably lock tire rim 178 to expandable hub 40. Hose connections 174 and 176 (if required) are used to inflate built tire 180 to the desired pressure. When built tire 180 has been inflated and releasably mounted on expandable hub 40, built tire 180, expandable hub 40 and main axle 22 may be moved to their second position in which built tire 180 is radially adjacent to tread mold supporting arms 120 and centered within expanded opening 206 of expandable tread mold 200.

Expandable tread mold 200 is installed or loaded onto retreading material 184 when built tire 180 is in its second position. As will be explained later in more detail, after tread mold segments 202 have been released from their respective mold supporting arms 120, expandable hub 40 along with rim 178 and built tire 180 may be returned to its first position. In this first position, built tire 180 may be deflated along with releasing the pneumatic pressure in chamber 52 which holds segmented rim 178 radially expanded. With built tire 180 and expandable hub 40 depressurized, built tire 180 with expandable tread mold 200 loaded thereon may be removed from tread loading machine 20. Another expandable tread mold 200 may be loaded onto tread mold supporting arms 120 and another built tire 180 may then be placed on tire rim 178 to repeat the process of installing another expandable tread mold 200 onto another built tire 180.

For some applications it may be desirable to color code one or more tread mold supporting arms 120 and the associated mold segments to assist with proper installation of expandable tread mold 200 on tread mold loading machine 20. For other applications, an alignment bar (not shown) may be mounted on the exterior of expandable tread mold 200 for engagement with a selected tread mold supporting arm 120. The alignment bar and/or color coding may be used to provide a unique identifier which allows positioning expandable tread mold 200 in a selected position relative to tread mold supporting arms 120.

The front of control panel 32 is shown in FIG. 3. First switch 271 is provided with open and close buttons 271a and 271b respectively. First switch 271 is used to move tread mold supporting arms 120 radially with respect to main axle 22 and expandable hub 40 and to open or close expandable tread mold 200 as desired. Second switch 272 is provided to open and close clamps 140 associated with each tread mold supporting arm 120. For some applications, safety latch 282 may be provided to prevent accidental movement of second switch 272 from the close position to the open position. This feature of control panel 32 is shown in more detail in FIG. 3A.

Third switch 273 is provided on control panel 32 for use in centering built tire 180 within expanded opening 206 formed by expandable tread mold 200. Fourth switch 274 is preferably provided to inflate and deflate built tire 180 as desired. Fifth switch 275 is provided on control panel 32 to inflate and deflate expandable hub 40 and segmented tire rim 178 for use in mounting and removing built tire 180 therefrom. Sixth switch 276 is provided to activate brake system 250 and prevent undesired longitudinal movement of main axle 22 and expandable hub 40. Seventh switch 277 is provided to control brake system 250 to prevent undesired rotation of main axle 22 and expandable hub 40 while loading expandable tread mold 200 on retreading material 184. For some applications, eighth switch 278 may be provided to increase the inflation rate of built tire 180.

Figure 5:
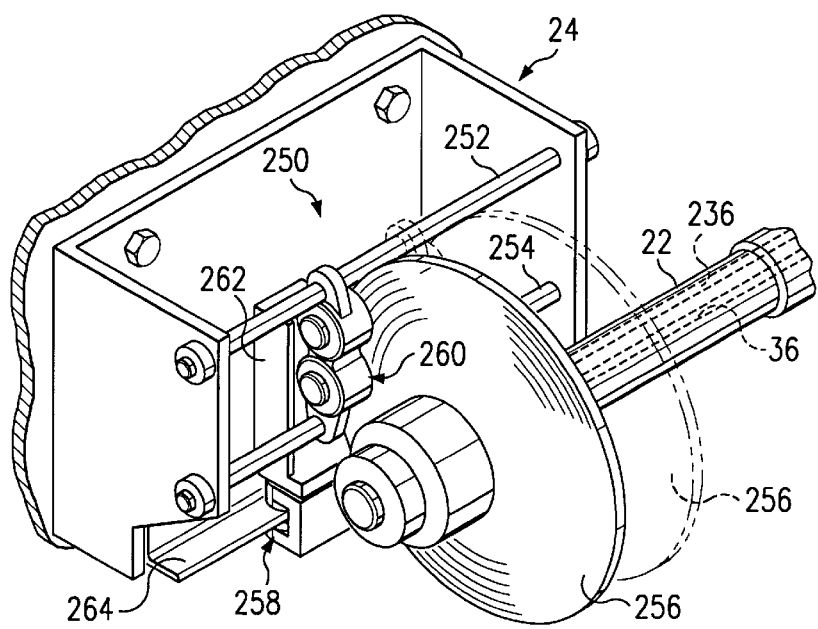
FIG. 5 is a schematic drawing with portions broken away showing an isometric view of a brake system incorporating teachings of the present invention for use with the tread mold loading machine of FIG. 1.

As shown in FIGS. 2 and 5, tread mold loading machine 20 preferably includes brake system 250 disposed within housing 24 and coupled with main axle 22. Brake system 250 preferably includes a pair of rails 252 and 254 which are aligned parallel to and offset from main axle 22. Brake system 250 also includes angle iron 264 which is also aligned parallel to and offset from main axle 22. Rails 252 and 254 and angle iron 264 are secured to housing 24 so that brake system 250 may be used to prevent longitudinal and/or rotational movement of main axle 22 as desired.

Brake rotor 256 is mounted on the exterior of main axle 22 adjacent to the end of main axle 22 having air coupling 38. A portion of brake rotor 256 extends into a first pair of C-calipers 260 and caliper housing 262 such that main axle 22 and caliper housing 262 will only move in unison with each other. A second pair of C-calipers 258 are also secured to caliper housing 262. A portion of angle iron 264 is disposed within the second pair of C-calipers 258 such that C-calipers 258 can engage angle iron 264 and prevent longitudinal movement of main axle 22. Caliper housing 262 is slidable relative to rails 252 and 254 and angle iron 264. C-calipers 258 and 260 are substantially similar to each other in design and are preferably operated by pneumatic air pressure. However, electrical brake calipers may be satisfactorily used with tread mold loading machine 20.

C-calipers 258, housing 262, brake rotor 256 and angle iron 264 cooperate with each other to provide a first brake assembly to prevent undesired longitudinal movement of the main axle 22. Linear brake switch 276 on control panel 32 is used to control the supply of pneumatic air pressure which activates C-calipers 258 to tightly grip angle iron 264 preventing longitudinal movement of caliper housing 262 and main axle 22.

C-caliper 260, brake rotor 256, housing 262 and rails 252 and 254 cooperate with each other to provide a second brake assembly which prevents undesired rotational movement of main axle 22. Rotary brake switch 277 on control panel 32 is used to supply pneumatic pressure to activate C-caliper 260 and tightly grip brake rotor 256 which prevents rotation of main axle 22. C-calipers 258 and 260 can be activated independently from each other. Thus, brake system 250 may be used to prevent rotational movement of axle 22 while allowing longitudinal movement of axle 22 or prevent longitudinal movement of axle 22 while allowing rotational movement of axle 22 or prevent both rotational and longitudinal movement of axle 22.

As best shown in FIG. 4, annular collar 62 is disposed on the exterior of hollow drive shaft 80 intermediate the ends thereof. Annular gear 64 is secured to one side of annular collar 62. Annular bearing 66 is secured to the opposite side of annular collar 62 and provides a portion of the means for positioning hollow drive shaft 80 and main axle 22 within housing 24. Annular bearing 66 may be a Rotek Series 3000 bearing available from the Hoesch Group.

One portion 66a of annular bearing 66 is secured to collar 62. The other portion 66b of annular bearing 66 is secured to housing 24 via couplings 68. A plurality of balls 69 are disposed between annular bearing races or portions 66a and 66b. Annular collar 62 cooperates with annular bearing 66 and couplings 68 to allow rotation of hollow drive shaft 80 relative to housing 24. Rotary bearings 60 contained within hollow drive shaft 80 allow rotation of main axle 22 and/or hollow drive shaft 80 relative to each other. Dust cover 72 is installed on the front of head assembly 90 to protect the bearings and gears associated with main axle 22 and hollow drive shaft 80 from contamination and debris.

Pinion gears 100 are secured to the end of each radial arm 94 which extends into head assembly 90. Flange and bearing assembly 102 is used to secure each radial arm 94 within its respective opening 84 in head assembly 90 and to position each pinion gear 100 adjacent to and contacting annular gear 64. By disposing each pinion gear 100 in contact with annular gear 64, rotation of hollow drive shaft 80 will be translated into rotation of each radial arm 94. Thus, rotation of hollow drive shaft 80 in a clockwise direction is translated into clockwise rotation of radial arms 94. In a similar manner, rotation of hollow drive shaft 80 in a counterclockwise direction results in counterclockwise rotation of radial arms 94. An important feature of the present invention is that rotation of hollow drive shaft 80 results in rotation of each radial arm 94 in unison with the other radial arms 94.

Sprocket gear 74 is mounted on the exterior of hollow drive shaft 80 spaced longitudinally from flange 62. Drive chain 76 connects sprocket gear 74 with electrical motor 28. Appropriate control signals are transmitted from control panel 32 to electrical motor 28 to cause either clockwise or counterclockwise rotation of hollow drive shaft 80 via drive chain 76 and sprocket gear 74. If desired for specific applications, electrical motor 28 could be replaced with other types of prime movers such as a hydraulic motor or a pneumatic motor.

For some applications, electrical motor 28 will preferably have a first speed and a second speed for rotation of sprocket gear or drive gear 74 where the first speed is faster than the second speed. Second limit switch 296, which will be described later in more detail, may also be provided on one or more tread mold supporting arms 120 to shift electrical motor 28 from its first speed to its second speed when the tread mold supporting arms 120 are within a selected distance from retreading material 184 on the exterior of built tire 180. The second slower speed associated with electrical motor 28 may also be used when tread mold loader 20 is used to release expandable mold 200 after retreading material 184 has been cured. The second, slow speed provides higher torque required to release mold segments 202 from cured retreading material 184.

Each mold supporting arm 120 is engaged with its associated radial arm 94. Mold supporting arms 120 include openings 124, 126 and 128 extending radially therethrough. Opening 126 includes hollow bushing 136 to allow mold supporting arms 120 to slide over the exterior of their respective guide rail 96. In the same manner opening 128 includes hollow bushing 138 which allows mold supporting arms 120 to slide over the exterior of their respective guide rail 98.

Threaded bushing 134 is preferably installed into each opening 124 and secured therein by flange 130. Bolts 132 may be used to secure flange 130 and bushing 134 into each opening 124. The interior of bushing 134 contains threads 131 which match threads 103 on the exterior of radial arms 94. Thus, rotation of radial arms 94 by hollow drive shaft 80 is translated by matching threads 103 and 131 into radial movement of mold supporting arms 120, either inwardly or outwardly with respect to main axle 22 and built tire 180 when mounted thereon. If desired for selected applications, radial arms 94 could be replaced by a plurality of hydraulic cylinders (not shown) to move mold supporting arms 120 radially inward and outward.

Each mold supporting arm 120 includes housing 122 with clamp assembly 140 partially contained therein. The principal elements of clamp assembly 140 includes a pair of fingers 142 and 144 which extend from housing 122. In FIGS. 7 and 8, housing 122 is shown with cover 121 removed to better illustrate the components which comprise clamp assembly 140. Air cylinder 118 and piston 116 which will be described later in more detail are not shown in FIGS. 7 and 8.

Fingers 142 and 144 are securely engaged with their associated racks 152 and 154. Pinion gear 146 is disposed within housing 122 between racks 152 and 154. Matching teeth 148 are provided on the exterior of pinion gear 146 to engage similar teeth 148 on each rack 152 and 154. Thus, by rotation of pinion gear 146, racks 152 and 154 are moved longitudinally with respect to each other. For the embodiment of the present invention shown in FIGS. 7 and 8, rotation of pinion gear 146 in one direction causes racks 152 and 154 to move their associated fingers 142 and 144 longitudinally towards each other. In the same respect, rotation of pinion gear 146 in the other direction causes movement of fingers 142 and 144 longitudinally away from each other. Such movements are used to engage and disengage each clamp assembly 140 from its associated mold segment 202. Slots 162 and 164 are provided within housing 122 to assist and guide movement of racks 152 and 154 respectively with their associated fingers 142 and 144. If desired, pinion gear 146 and racks 152 and 154 could be replaced by hydraulic cylinders (not shown) to move fingers 142 and 144 with respect to each other.

Rack 152 is similar to rack 154 except end 156 of rack 152 opposite from finger 142 is formed in an arc which defines a radius of curvature matching the radius of curvature of pinion gear 146. Slot 162 contains a longitudinal portion 168 and a portion extending radially therefrom 166. Radial portion 166 of slot 162 cooperates with radial portion or end 156 of rack 152 to allow finger 142 to move both longitudinally and to pivot with respect to pinion gear 146. Thus, pinion gear 146 and racks 152 and 154 are able to move fingers 142 and 144 longitudinally towards and away from each other in addition to pivoting finger 142 away from finger 144. Pivoting finger 142 to its second position shown in FIG. 8 facilitates installation and removal of the associated mold segment 202 which may be releasably secured between fingers 142 and 144.

Heads 143 and 145 are provided respectfully on the end of each finger 142 and 144 extending from housing 122. Heads 143 and 145 may be inserted into appropriately sized slots 208 in each side of the respective mold segment 202. Another important feature of the present invention is that various types of mold segments may be used with tread mold loading machine 20 by either simply replacing the head on fingers 142 and 144 to match slots in the new mold segments or providing a matching slot in each side of the new mold segments for the existing heads 143 and 145.

Figure 9:
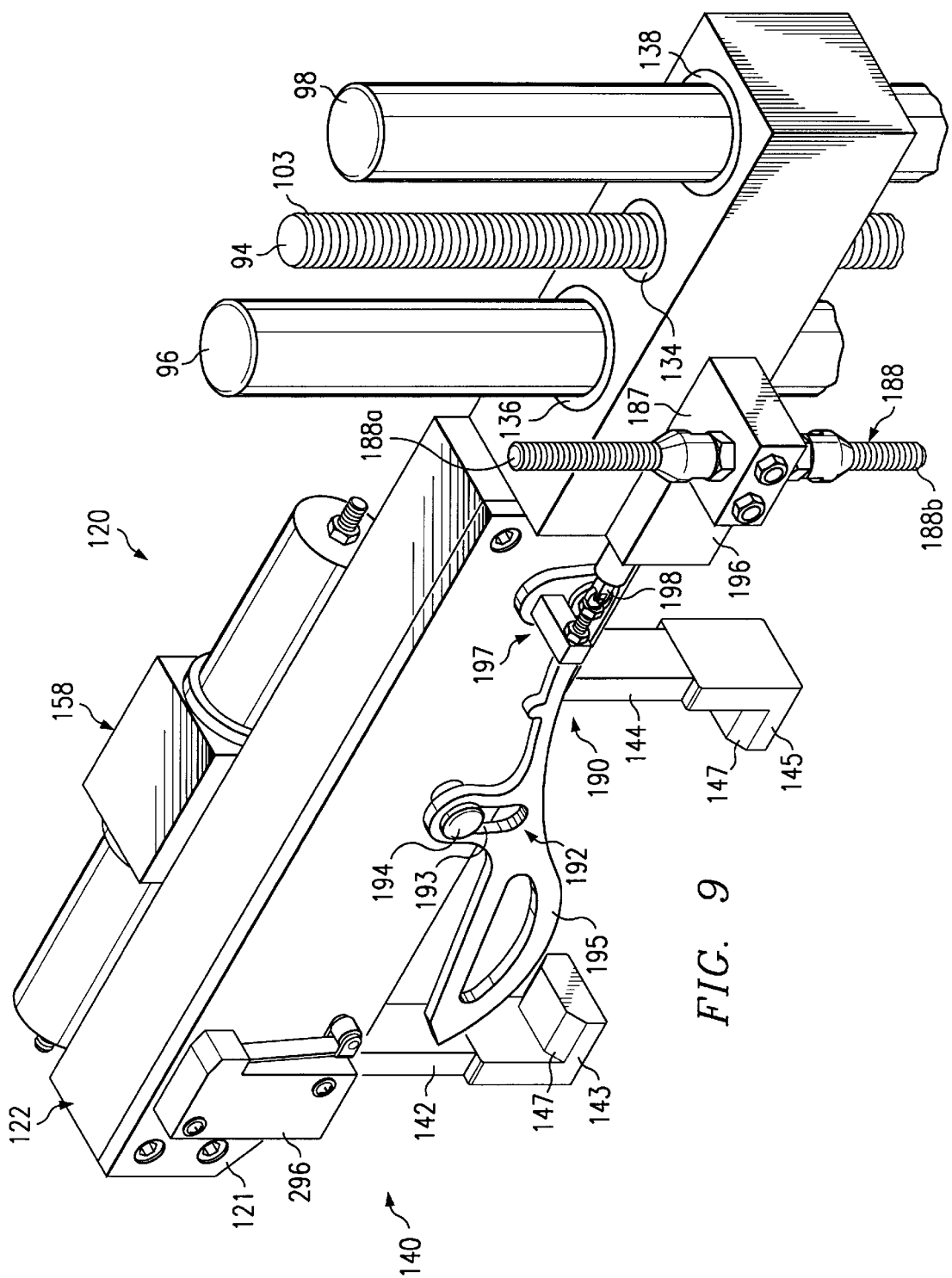
FIG. 9 is an isometric drawing with portions broken away of the tread mold supporting arm of FIGS. 7 and 8 engaged with its associated radial arm and guide rails.

As shown in FIGS. 1 and 9, actuators 158 are positioned on the exterior of each housing 122. Shaft 160 extends from actuator 158 into housing 122. Pinion gear 146 is secured to shaft 160 by key 170. Therefore, when shaft 160 is rotated by actuator 158, pinion gear 146 will rotate and move fingers 142 and 144 either towards each other or away from each other depending upon the direction of rotation of pinion gear 146. Actuator 158 as shown in FIG. 9 is air operated. As previously noted, various components of tread mold loading machine 20 may be either air operated, electrically operated or hydraulically operated. Actuator 158 is an example of an air operated component which could be replaced by an electric motor or a hydraulic motor.

Figure 12:
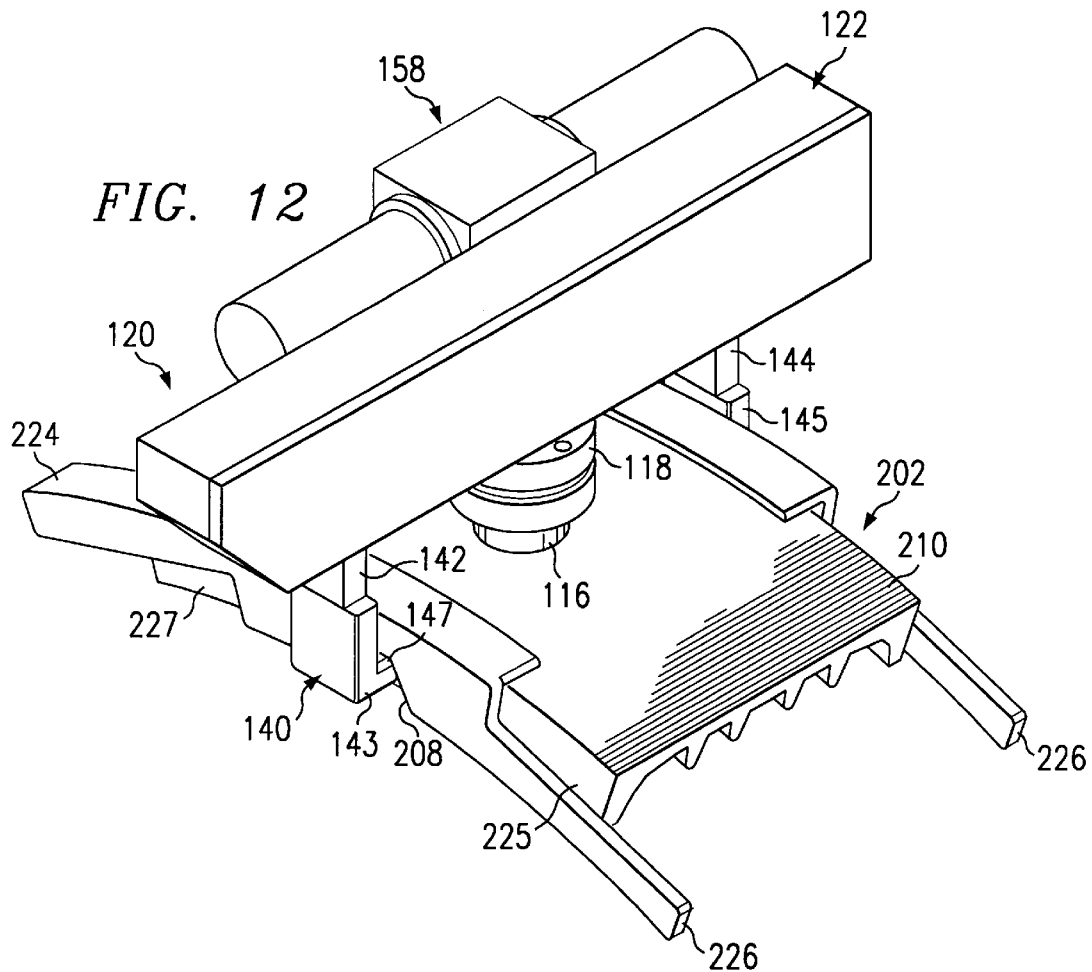
FIG. 12 is a schematic drawing with portions broken away showing the mold segment of FIG. 11 engaged with a tread mold supporting arm in accordance with the teachings of the present invention.

As shown in FIGS. 2 and 12, tread mold supporting arms 120 preferably include air cylinder 118 with piston 116 disposed therein. When mold clamp switch 272 on control panel 32 is moved to the close position, pneumatic air pressure is supplied to actuator 158 to move the respective clamp 140 associated with each tread mold supporting arm 120 to their closed position as shown in FIGS. 7 and 12. After heads 143 and 145 have been engaged with slots 208 in the respective mold segment 202, pneumatic air pressure is supplied to cylinder 118 to extend piston 116 and contact the exterior of the associated mold segment 202. Thus, air cylinder 118 and piston 116 cooperate with fingers 142 and 144 to ensure that each mold segment 202 is securely engaged with its respective clamp 140 by applying force to the exterior of each mold segment 202. Air cylinder 118 is preferably deactivated after each mold segment 202 has been securely engaged with its respective clamp 140.

At least one mold supporting arm 120 will preferably include first sensor assembly 190 to indicate when the associated mold segment 202 has contacted retreading material 184. As shown in FIG. 9, first sensor 190 includes lever 192 mounted on the exterior of housing 122 by slot 193 and pivot pin 194. Slot 193 and pivot pin 194 cooperate to allow limited radial movement and pivoting movement of lever 192 relative to housing 122. End 195 of lever 192 is enlarged for contact with exterior surface 210 of tread mold segment 202 associated with the selected mold supporting arm 120 carrying first sensor 190.

First limit switch 196 is secured to supporting arm 120 as part of first sensor 190. The other end 197 of lever 192 is positioned adjacent to first limit switch 196. In FIG. 9, lever 192 is shown in its first position which will allow end 195 to contact exterior surface 210 of an associated mold segment 202. In this first position, end 197 of lever 192 engages first limit switch 196 to allow rotation of radial arms 94 and corresponding inward movement of all mold supporting arms 120. An alignment bar (not shown) may be provided on the exterior of a selected mold segment 202 to engage lever 192 and assist with radial positioning of tread mold 200 relative to tread mold supporting arms 120.

Second limit switch 296 is also secured to the same supporting arm 120 as part of first sensor 190. Second limit switch 296 is located adjacent to end 195 of lever 192. When the associated mold segment 202 initially contacts retreading material 184, end 195 will activate second limit switch 296 which will shift prime mover 28 from its first speed to its second speed.

After the selected mold segment 202 associated with first sensor 190 contacts retreading material 184, the selected mold segment 202 will move upwardly forcing end 195 to move upwardly with respect to pivot pin 194 and rotate end 197 to release limit switch 196. When disengagement between end 197 and limit switch 196 occurs, prime mover or electrical motor 28 will be prevented from further rotation of radial arms 94 to move mold supporting arms 120 inwardly towards built tire 180. First sensor 190 thus prevents placing undesired forces on built tire 180 if radially inward movement of mold supporting arms 120 continued after mold segments 202 contact retreading material 184.

First sensor 190 can be used to reduce the speed of prime mover 28 when tread mold supporting arms 120 are a selected distance from retreading material 184, and stop the movement of tread mold supporting arms 120 after expandable tread mold 200 has been properly engaged with retreading material 184.

For some applications limit switch 196 could be mounted directly to housing 122 with plunger 198 positioned above the associated mold segment 202. In this alternative configuration, when the associated mold segment 202 moves upward towards housing 122, it would contact plunger 198 and activate limit switch 196. If desired, more than one mold supporting arm 120 may carry first sensor assembly 190.

Bracket 187 with rod 188 extending therethrough is also attached to the side of at least one mold supporting arm 120. Rod 188 is used to trip additional limit switches (not shown) which define the maximum amount of radial travel for mold supporting arms 120 both inwardly and outwardly with respect to main axle 22. When the selected mold supporting arm 120 has reached the outermost limit of its desired travel, rod segment 188a will contact the upper limit switch. When the selected mold supporting arm 120 has reached its maximum desired radial travel inwardly towards main axle 22, rod segment 188b will activate the inner limit switch. If desired, more than one mold supporting arm 120 may carry rod 188.

Figure 11:
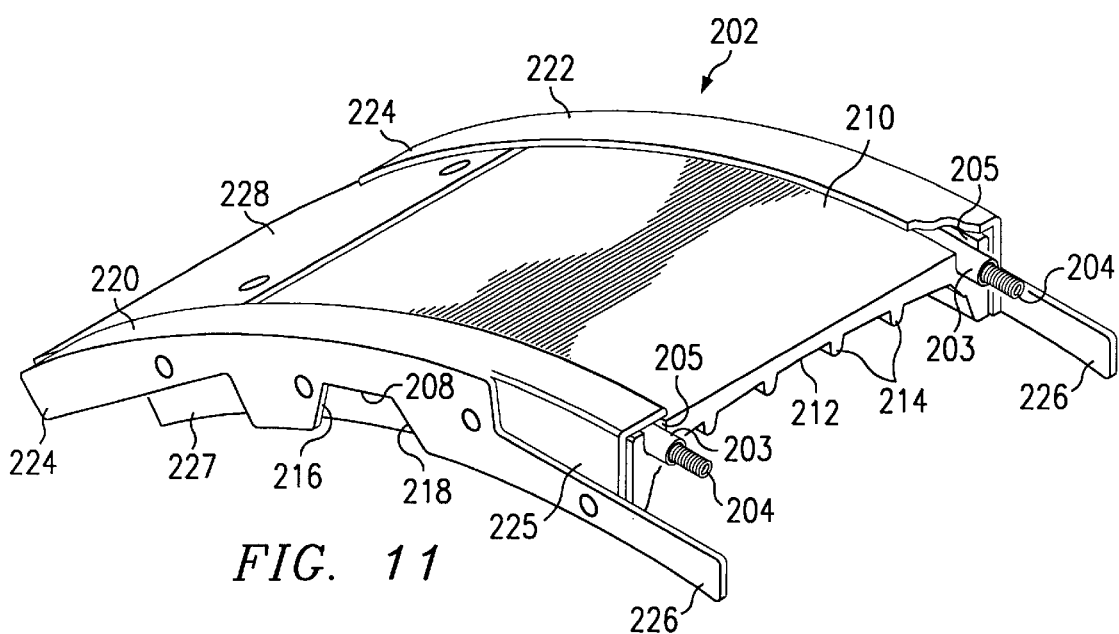
FIG. 11 is an isometric drawing showing one of the mold segments associated with the expandable tread mold of FIG. 10.

As shown in FIGS. 2, 11 and 12, expandable tread mold 200 includes a pair of tension springs 204 disposed in grooves 205 on the exterior of each mold segment 202. For some applications, each tension spring 204 may be disposed within hollow elastomeric tube 203 to minimize corrosion of the respective spring 204. If desired, an elastomeric tension band could also be provided on the exterior of the mold segments 202 between tension springs 204. A segmented tread mold with tension springs and an elastomeric band are shown in more detail in U.S. Pat. No. 5,342,462.

Each mold segment 202 is expandably engaged with an adjacent mold segments 202 for placement on retreading material 184. Tension springs 204 provide resilient means in circling mold segments 202 and urging mold segments 202 toward retreading material 184. Each mold segment 202 has a generally rectangular configuration with exterior surface 210 and interior surface 212 having a radius of curvature corresponding approximately to the radius of curvature of retreading material 184 on the exterior of built tire 180.

The desired tread pattern 214 is formed on interior surface 212 of each mold segment 202. Engagement slots 208 are formed on opposite sides of each mold segment 202. Each engagement slot 208 preferably includes tapered surfaces 216 and 218 having dimensions which correspond approximately with the dimensions of chamfered surfaces 147 formed on heads 143 and 145 of the respective clamp 140.

Each mold segment 202 preferably includes a pair of frames 220 and 222 extending along and attached to opposite sides of each mold segment 202. Frames 220 and 224 are essentially identical with each other. Frames 220 and 222 have a radius of curvature corresponding approximately with the radius of curvature of exterior surface 210 and interior surface 212. Frames 220 and 222 are longer than the associated mold segment 202.

End 224 of each frame 220 and 222 extends from one end of the respective mold segment 202. In the same manner, end 226 of each frame 220 and 222 extends from the opposite end of the respective mold segment 202. Frame 220 and 222 form channels 225 and 227 which are sized to respectively receive ends 224 and 226 of frames 220 and 222 of adjacent mold segments 202. Thus, ends 224 and channels 225 along with ends 226 and channels 227 cooperate with each other to maintain the desired alignment of mold segments 202 with respect to each other while at the same time allowing expansion and contraction of expandable tread mold 200.

Metal plate 228 is preferably attached to exterior surface 210 of each mold segment 220 between frames 220 and 222. For some applications metal plate 228 is formed from aluminum. Metal plate 228 extends from one end of the respective mold segment 202 and covers the end of an adjacent mold segment 202. The length of plate 228 is selected to cover a portion of exterior surface 210 of an adjacent mold segment 202 and the gap formed between adjacent mold segments 202 when mold segments 202 are expanded relative to each other.

Figure 13:
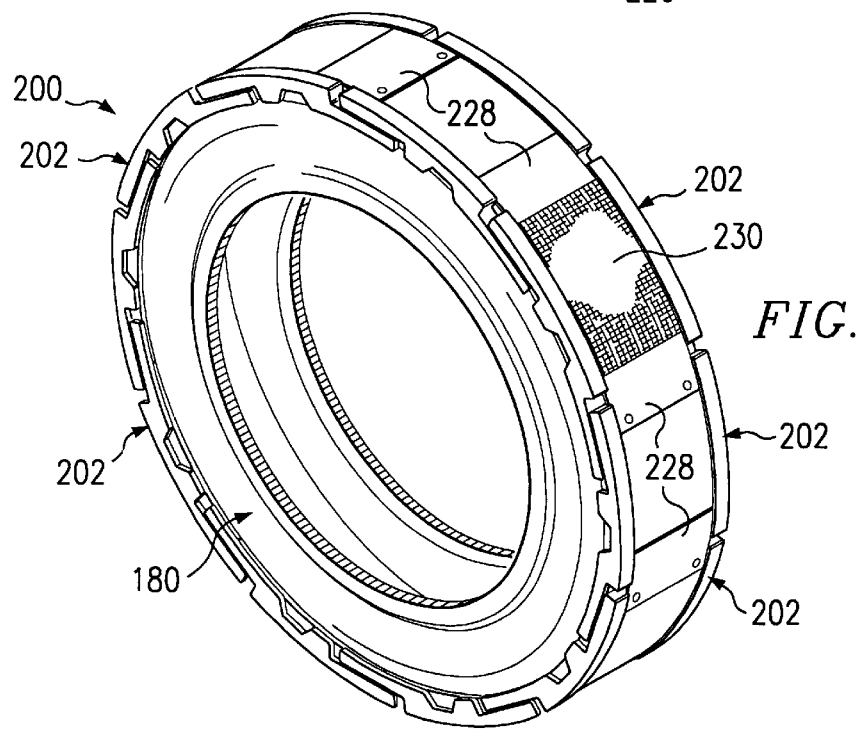
FIG. 13 is a schematic drawing showing an isometric view of the expandable tread mold of FIG. 10 loaded on a built tire in accordance with the teachings of the present invention.

When expandable tread mold 200 is in its fully expanded position as shown in FIG. 1, a gap of approximately one and one-half inches may be formed between the ends of adjacent mold segments 202. When expandable tread mold 200 has been installed or loaded on built tire 180 as shown in FIG. 13, the gap between adjacent mold segments 202 will be approximately five eighths of an inch. The size of the gap between adjacent mold segments will depend upon the dimensions associated with built tire 180 and the amount of retreading material 184 disposed on the exterior of built tire 180.

One of the advantages of the present invention includes the ability to modify the dimensions of expandable tread mold 200 and mold segments 202 for use with a wide variety of tread patterns and tire sizes. The dimensions of interior surface 212 may vary from approximately six and one-half inches to twelve and one-half inches in width. The dimensions of exterior surface 210 may vary from seven inches to thirteen and one-half inches in width. The length of mold segments 202 may vary from approximately twelve inches to twenty-four inches.

Figure 10:
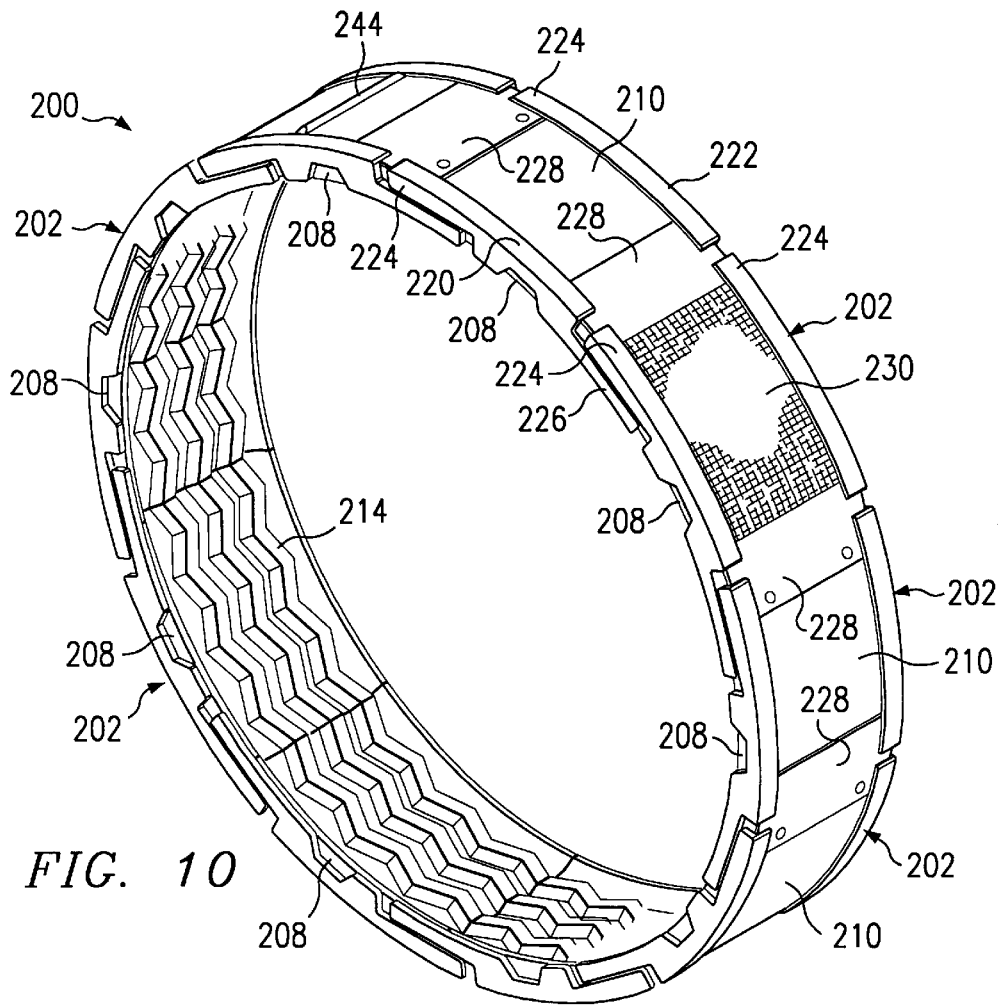
FIG. 10 is an isometric drawing of an expandable tread mold incorporating teachings of the present invention which may be used with the tread mold loading machine of FIG. 1.

As shown in FIG. 10, a layer of wicking material 230 is preferably disposed on the exterior of at least mold segment 202. During the curing process, the gap between adjacent mold segments 202 will be reduced even further until the ends of adjacent mold segments 202 are almost in contact with each other. The present invention results in only a very small amount of rubber flashing (if any) being extruded between the ends of adjacent mold segments 202 during the curing process which produces a retread tire having a desirable visual appearance.

In a process using the apparatus of the present invention, tire casing 182 is prepared to receive retreading material 184. One of the steps in preparing tire casing 182 includes buffing to completely remove the old tread pattern (not shown) and to provide the desired diameter, tread width and tire radius for built tire 180. Proper buffing will ensure maximum adhesion between retreading material 184 and tire casing 182. Uncured tread rubber along with one or more adhesive layers are then applied to tire casing 182 to form a layer of retreading material 184. Since the present invention includes expandable tread mold 200 which can accommodate variations in the dimensions of built tire 180, retreading material 184 with ample thickness may be used to provide a reservoir of uncured tread rubber to flow into any peaks or valleys associated with the buffed surface of tire casing 182. The bond strength between retreading material 184 and tire casing 182 is increased by providing ample thickness for retreading material 184 which results in increased dependability of the resulting retread tire.

The present invention allows the use of various types of mold cure tread compounds to form retreading material 184.

Examples of these mold cure tread compounds include "UltraPneu," "Pneuflex" and "PneuModal" which are available from Oliver Rubber Company located in Athens, Ga. Tread mold loading machine 20 and expandable tread mold 200 allow selecting the appropriate mold cure tread compound having appropriate characteristics to optimize the performance of the resulting retread tire. Expandable tread mold 200 is initially placed on tread mold loading machine 20 and expanded to its fully open position as shown in FIGS. 1 and 2. Expandable hub and tire rim 178 are moved to their first position as shown by dotted lines in FIG. 2 and built tire 180 mounted on tire rim 178. Built tire 180 is then inflated and expandable hub 40 moved to its second position as shown in FIG. 2. Mold segments 202 of expandable tread mold 200 are next placed on retreading material 184 with tread pattern 214 engaging the outer surface of retreading material 184.

After expandable tread mold 200 has been loaded on retreading material 184, built tire 180 and the associated tread mold 200 are removed from tread mold loader 20. A pressure envelope or elastomeric curing envelope (not shown) is then stretched over the assembled tread mold 200 and built tire 180. Seal rings (not shown) are used to form a seal between tire beads 186 and the curing envelope. A vacuum is drawn on the curing envelope to remove any air and to assist in creating a pressure differential across expandable tread mold 200 and retreading material 184 during the curing process.

The sealed assembly is then placed in a curing chamber at the appropriate pressure and temperature and for the length of time required to cure retreading material 184 with the tread pattern provided by mold segments 202. After-proper curing of retreading material 184, the sealed assembly may be removed from the curing chamber. Built tire 180 and expandable mold 200 are then removed from the curing envelope and mounted on tire rim 178 and expandable hub 40. Built tire 180 and expandable tread mold 200 are centered within tread mold support arms 120 and each clamp 140 engaged with its respective mold segment 202. The tread mold supporting arms 120 are moved to their fully expanded position which releases expandable tread mold 200 from built tire 180 with cured retreading material 184 having the desired tread pattern.

From the foregoing description, it will be appreciated that the apparatus and methods of the present invention, permit retreading of tires without the necessity of distorting the tire casing or requiring the use of expensive mold stretchers. The operation of loading or installing a tread mold on a built tire can be performed simply and quickly to efficiently retread tires.

Although the present invention and its advantages have been described in detail, it should be understood that various changes, substitutions and alterations can be made therein without departing from the spirit and scope of the invention as defined in the following claims.

What is claimed is:

1. An apparatus for loading a tread mold on a built tire which includes a prepared tire carcass with retreading material on the exterior of the tire carcass, the tread mold having a plurality of mold segments and the apparatus having a number of expandable tread mold supporting arms equal to the number of mold segments comprising:

a respective clamp assembly carried by each tread mold supporting arm for engagement with an associated mold segment;

means for moving each tread mold supporting arm radially relative to the built tire;

means for engaging and disengaging each clamp assembly from the associated mold segment; and a sensor assembly to indicate when at least one mold segment contacts the retreading material on the built tire.

2. The apparatus of claim 1 wherein each clamp assembly further comprises:

a pair of fingers for engagement with the associated mold segment; and each finger having a head extending therefrom and sized to fit within a matching opening in each side of the associated mold segment.

3. The apparatus of claim 2 wherein each clamp assembly further comprises:

each finger attached to and extending from an associated rack; and each rack engaged with a gear whereby rotation of the gear causes movement of the fingers relative to each other.

4. The apparatus of claim 1 further comprising:

an actuator carried on the exterior of each of the tread mold supporting arms; and the actuator connected with the respective clamp assembly to provide a portion of the means for engaging or disengaging the respective clamp assembly from the associated mold segment.

5. An apparatus for loading a tread mold on a built tire which includes a prepared tire carcass with retreading material on the exterior of the tire carcass, the tread mold having a plurality of mold segments and the apparatus having a number of expandable tread mold supporting arms equal to the number of mold segments comprising:

a respective clamp assembly carried by each tread mold supporting arm for engagement with an associated mold segment:

means for moving each tread mold supporting arm radially relative to the built tire;

means for engaging and disengaging each clamp assembly from the associated mold segment;

a sensor assembly to indicate when at least one mold segment contacts the built tire;

the sensor assembly including a lever having a first end and a second end with the lever pivotally attached intermediate the ends thereof to at least one tread mold supporting arm;

one end of the lever positioned to contact the associated mold segment; and the other end of the lever positioned adjacent to a limit switch.

6. The apparatus of claim 5 wherein the sensor assembly further comprises:

the limit switch having a first position which allows radial movement of the tread mold supporting arms towards the built tire and a second position which stops radial movement of the tread mold supporting arm towards the built tire; and the other end of the lever holding the limit switch in its first position until the associated mold segment contacts the built tire.

7. An apparatus for loading a tread mold on a built tire which includes a prepared tire carcass with retreading material on the exterior of the tire carcass, the tread mold having a plurality of mold segments and the apparatus having a number of expandable tread mold supporting arms equal to the number of mold segments comprising:

a clamp assembly carried by each tread mold supporting arm for engagement with an associated mold segment;

means for moving each tread mold supporting arm radially relative to the built tire;

means for engaging and disengaging each clamp assembly from the associated mold segment; and a sensor assembly to indicate when at least one mold segment contacts the retreading material;

the sensor assembly including a lever having a pivot end and a second end with the lever pivotally attached intermediate the ends thereof to the exterior of the tread mold supporting arm;

one end of the lever positioned to contact the associated mold segment; and the other end of the lever positioned adjacent to a limit switch.

* * * * *